United States Patent
Rohweder et al.

[19]

[11] Patent Number: 6,105,643
[45] Date of Patent: Aug. 22, 2000

[54] ON/OFF ROAD RADIAL PNEUMATIC LIGHT TRUCK OR AUTOMOBILE TIRE

[75] Inventors: Efimia Ellen Rohweder, Uniontown; Frederick William Miller, Akron; Michael Alois Kolowski, Mogadore; Stephanie Carol Brown, Akron, all of Ohio

[73] Assignee: The Goodyear Tire & Rubber Company, Akron, Ohio

[21] Appl. No.: 09/142,409

[22] PCT Filed: Jun. 24, 1996

[86] PCT No.: PCT/US96/11039

§ 371 Date: Sep. 4, 1998

§ 102(e) Date: Sep. 4, 1998

[87] PCT Pub. No.: WO97/27070

PCT Pub. Date: Jul. 31, 1997

Related U.S. Application Data

[63] Continuation-in-part of application No. 29/050,569, Jan. 25, 1996, abandoned.

[51] Int. Cl.⁷ .............................. B60C 11/11; B60C 11/13; B60C 101/00; B60C 101/02; B60C 121/00

[52] U.S. Cl. .............................. 152/209.21; 152/209.22; 152/209.26; 152/209.27; 152/902

[58] Field of Search .......................... 152/209.18, 209.21, 152/209.22, 209.26, 209.27, 902

[56] References Cited

U.S. PATENT DOCUMENTS

| | | | |
|---|---|---|---|
| 1,504,694 | 8/1924 | Litchfield | 152/209.22 |
| 2,642,914 | 6/1953 | Palko et al. | 152/902 |
| 3,055,410 | 9/1962 | Caulkins | 152/209 |
| 4,114,671 | 9/1978 | Maiocchi et al. | 152/209.21 |
| 4,676,290 | 6/1987 | Tansei et al. | 152/209 R |
| 4,823,855 | 4/1989 | Goergen et al. | 152/209 R |
| 4,854,358 | 8/1989 | Takeuchi | 152/209 R |
| 4,913,208 | 4/1990 | Anderson et al. | 152/902 |
| 5,088,536 | 2/1992 | Graas et al. | 152/209.22 |
| 5,099,899 | 3/1992 | Takeuchi | 152/209 R |
| 5,154,216 | 10/1992 | Ochiai et al. | 152/209 R |
| 5,246,049 | 9/1993 | Ramcke et al. | 152/209.21 |
| 5,256,221 | 10/1993 | Trabandt | 152/209.22 |
| 5,415,215 | 5/1995 | Covert et al. . | |
| 5,503,206 | 4/1996 | Consolacion et al. | 152/209.21 |
| 5,658,404 | 8/1997 | Brown et al. | 152/209.21 |

FOREIGN PATENT DOCUMENTS

| | | | |
|---|---|---|---|
| 503534A2 | 9/1992 | European Pat. Off. | B60C 11/06 |
| 681929A1 | 11/1995 | European Pat. Off. | B60C 11/04 |
| 423723A1 | 1/1996 | Germany | B60C 11/11 |
| 1-309806 | 12/1989 | Japan | 152/209.22 |
| 3-143707 | 6/1991 | Japan | 152/209.18 |

OTHER PUBLICATIONS

Copy of European Search Report.

*Primary Examiner*—Steven D. Maki
*Attorney, Agent, or Firm*—David L King

[57] ABSTRACT

An on/off road radial pneumatic light truck or automobile tire has a tread with at least one wide groove having an average width of at least 7% of the tread width. At least two axially adjacent rows of traction elements are separated by the wide groove. The tread has a plurality of protrusions extending from traction elements into the wide groove. The protrusions are sloped radially inwardly at an angle in the range of 20° to 60° relative to the radial direction from the outer surface of the traction element toward the tread base and crossing axially more than halfway across the wide groove width toward an intersection of a lateral groove and the wide groove. The protrusions extending from traction elements on one side of the wide groove are circumferentially offset and at least partially axially aligned with protrusions extending from traction elements on the opposite side of the wide groove.

4 Claims, 4 Drawing Sheets

ON/OFF ROAD RADIAL PNEUMATIC LIGHT TRUCK OR AUTOMOBILE TIRE

This application is a continuation-in-part of U.S. patent application Ser. No. 29/050,569 filed Jan. 25, 1996, now abandoned.

TECHNICAL FIELD

This invention relates to a radial pneumatic light truck or automobile tire. More particularly the tire has a tread designed for both on or off road applications.

BACKGROUND ART

With the continuing rise in popularity of light trucks, vans and four-wheel drive sport utility vehicles there exists a need to provide tires at have the ability to be driven on paved roads without excessive noise yet also to be capable of being driven in heavy snow or off paved roads in soft sand or muddy soil. Often these tires will be driven in flooded or wet roadway conditions. As an added condition, these multipurpose traction demands for the tire must be coupled with excellent tread wear.

Historically, tires have been able to meet one or two of the above-referenced design requirements but usually at the sacrifice of the other design features.

Snow tires and off road tires could achieve good traction usually by opening the thread pattern and providing large block type tread elements. These tires generally were very noisy and had poor tread wear when driven at highway speeds on paved roads. The Wrangler MT disclosed in U.S. Pat. No. 4,823,855 is an example of the aggressive style tread pattern need for aggressive off road applications.

A latter developed asymmetric nondirectional tire was developed for the light truck and sport utility vehicles called the Wrangler GSA. This tire employed a unique triple traction feature that provides excellent uniform wear across the tread pattern regardless of the wheel position. The tire has good noise, and more than adequate traction in a variety of conditions such as snow, off road and on read wet or dry. The tread pattern disclosed in U.S. Pat. No. 5,415,215 was one of the first truly multipurpose tires for these types of vehicles. The Wrangler GSA tire has been commercially very successful.

From that tire, a superior wet traction tire was developed employing two wide aquachannels in combination with the triple traction feature. The tire has been entitled the Wrangler Aquatred and it is disclosed in U.S. Pat. No. 5,658,404. This tire demonstrated that deep water traction could be enhanced without sacrificing the wear and other performance features of the original Wrangler GSA tire.

The Wrangler Aquatred demonstrated that while the all around performance of these light truck and sport utility vehicle tires must be very good, some drivers still have special needs or concerns requiring the more specialized type tire performance in one or more feature.

There has been a continual trade-off in attempting to increase the aggressive off road and snow tractive performance of the these tires while maintaining the tread wear durability and noise constraints.

The invention disclosed in this patent application teaches a novel tread that is both quiet and long wearing while also achieving excellent off road traction.

DISCLOSURE OF THE INVENTION

SUMMARY

An on/off road radial pneumatic light truck or automobile tire 10 has a tread 40, the tread when incorporated in the tire 10 has an axis of rotation R, a first and a second lateral edge 44,46, a tread width (TW) defined as the distance between the lateral edges 44,46. The tread 40 has a tread base 43, a plurality of laterally extending zig-zag grooves 57,58, a plurality of traction elements 42, and a plurality of circumferentially continuous grooves 53,54,55,56. At least one of the circumferentially continuous grooves is a wide groove 54,55 having an average width D,E of at least 7% of the tread width (TW) preferably about 10%. The plurality of laterally extending zig-zag grooves 57,58 intersect the circumferential grooves 53,54,55,56. The traction elements 42 extend radially outwardly from the tread base 43 to an outer surface 52 of the traction element and are oriented in circumferential rows 1,2,3,4,5,6. At least two axially adjacent rows (2,3 or 4,5) of traction elements 42 are separated by one wide groove 54,55.

The tread 40 has a plurality of protrusions 20 extending from traction elements 42 into the wide groove 54 or 55. The protrusions 20 slope radially inwardly at an angle of 20° to 60° relative to the radial direction from the outer surface 52 of the traction element 42 toward the tread base 43. The protrusions 20 cross axially more than halfway across the width of the wide groove 54 or 55 toward an intersection of a lateral groove 57 or 58 and the wide groove 54 or 55. The protrusions 20 extending from traction elements 42 on one side of the wide groove 54 or 55 are circumferentially offset and at least partially axially aligned with protrusions 20 extending from traction elements 42 on the opposite side of the wide groove 54 or 55.

In the preferred embodiment of the invention the tread is divided into two circumferentially continuous tread halves 11,12. Each tread half 11,12 has one of the wide grooves 54 or 55. Each wide groove 54,55 is adjacent to two rows (2,3 or 4,5) of traction elements, the traction elements 42 from each adjacent row 2,3,4,5 have protrusions 20 extending into the wide groove within each tread half. There are six rows of traction elements. Two rows 1,2 and 5,6 are between each lateral edge 44,46 and a wide groove 54,55, these two rows on each tread half 11,12 being separated by a narrow zig-zag circumferential groove 53.

The preferred tread 42 has a total net-to-gross ratio of 58% as measured around the entire circumference of the tire 10 between the lateral edges 44,46.

Each wide groove 54,55 has a centerline $C_L$ dividing the tread into three portions, a first 61, a middle 60 and a third portion 62. The middle portion 60 has a greater net contact area than either the first or third portion 61,62.

Another important feature of the tread 40 is each zig-zag lateral groove 57 intersecting the first or second lateral edge 44,46 has an enlarged generally axially extending inner end portion 57A intersecting one wide circumferential groove and an enlarged generally axially extending outer end portion 57C and a tie bar 64 located between the enlarged end portions 57A,57B, the tie bar 64 extending radially outward from the tread base 43 a distance (h) of about one-half the lateral groove depth d and lying in a common intersection of a circumferential groove 53 and a narrow portion 57B of the lateral groove 57 wherein the common intersection is generally circumferentially inclined. Additionally, a second tie bar 65 of a much lower radial height may be employed between the tie bar 64 and the enlarged end portion 57C. This orientation of the lateral zig-zag groove 57 is believed to improve the sound dampening quality of the tread 40.

It is believed most preferred that each of the traction elements 42 adjacent the wide grooves 54,55 has a protrusion 20 as described above. These sloping protrusions 20 when located in these wide grooves 54,55 assist in traction in snow or mud. They insure that the wide grooves 54,55 remain open in the mud. That is the grooves do not pack with mud. This self-cleaning feature in the groove in combination with the traction provided by the protrusion 20 increases the number of surfaces available to provide forward or rearward movement.

DEFINITIONS

Figure 1:
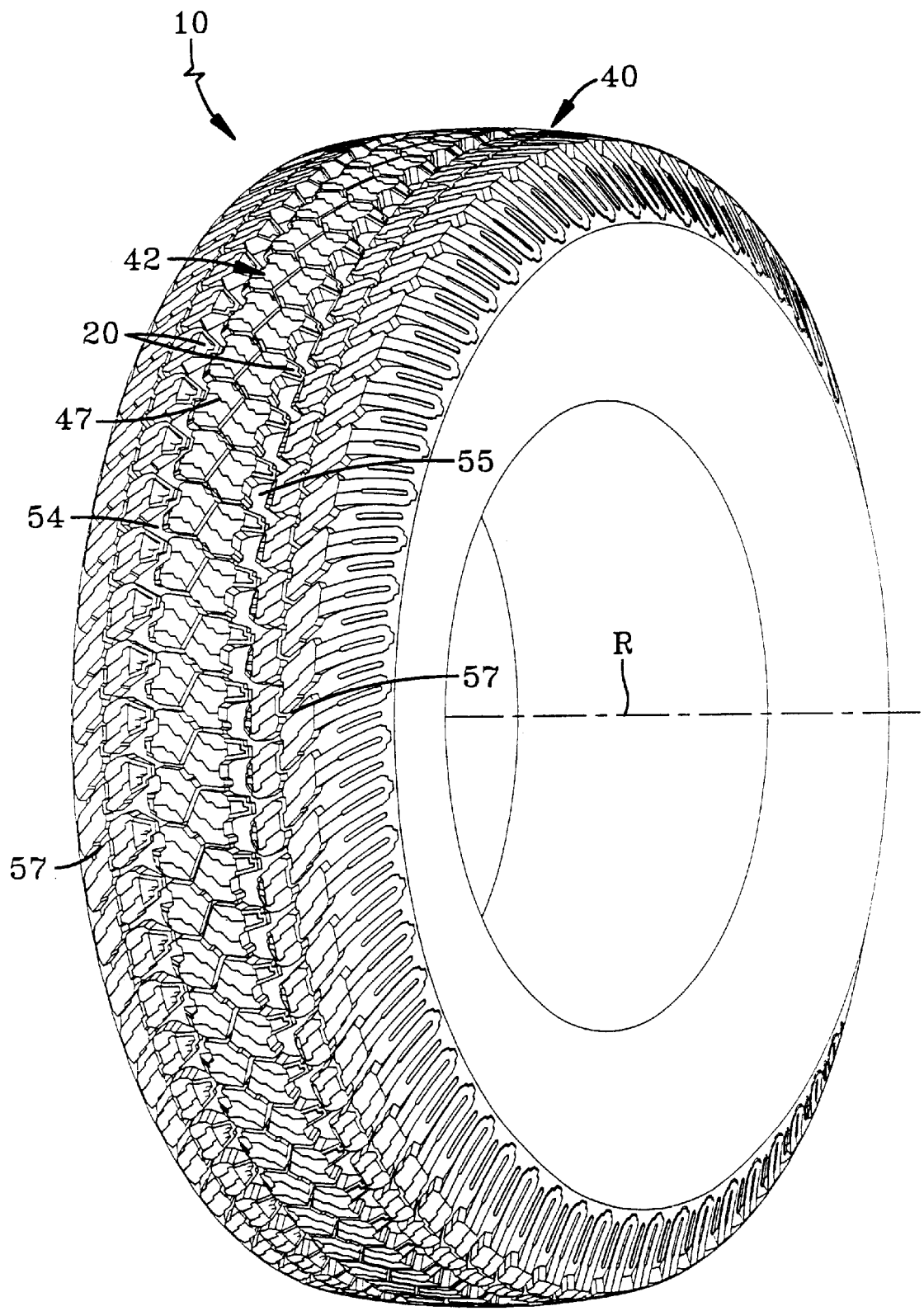
FIG. 1 is a perspective view of the tire according to a preferred embodiment of the invention.
Figure 2:
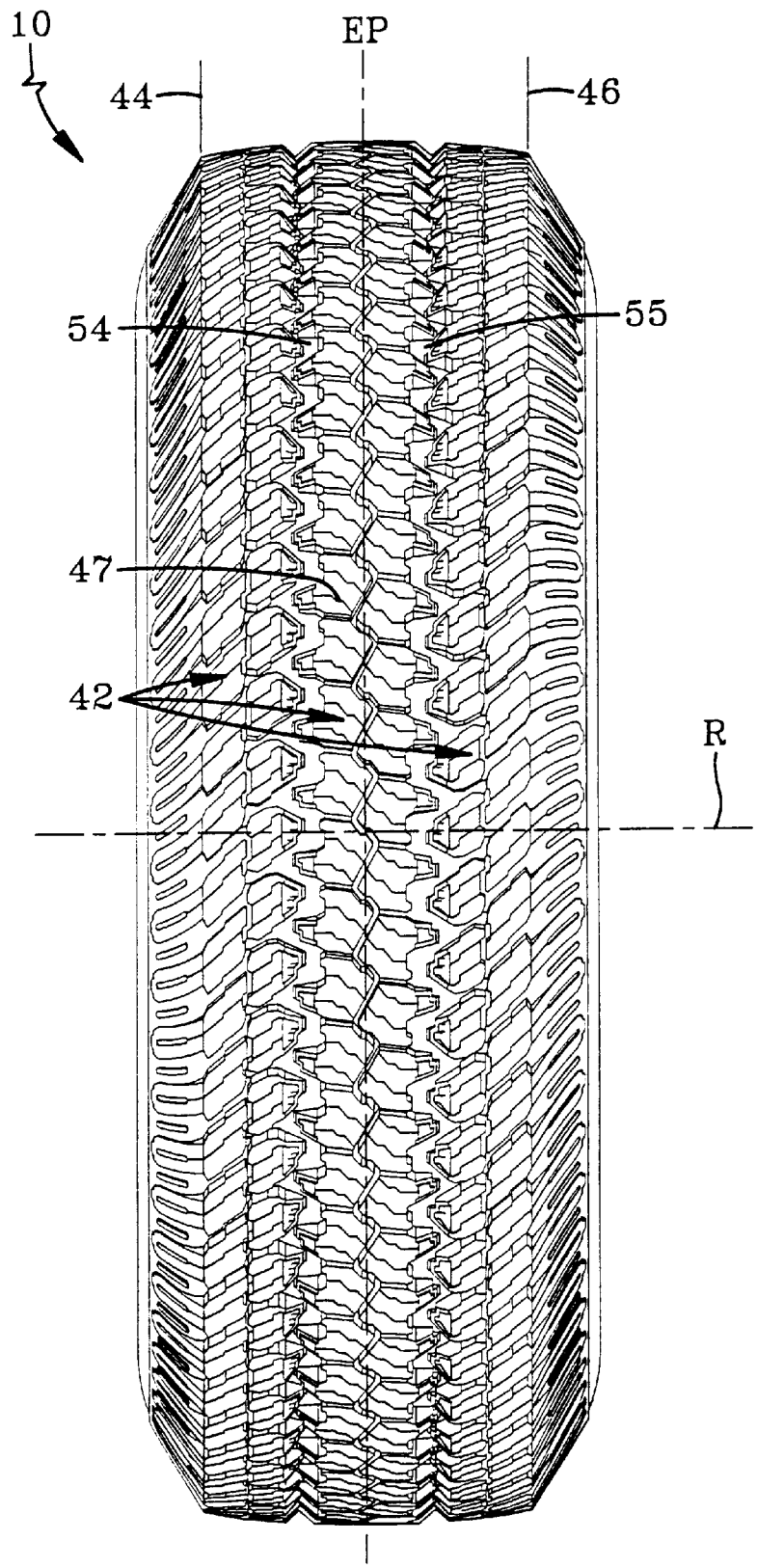
FIG. 2 is a plan view of the tire of FIG. 1.

For ease of understanding this disclosure the following terms are disclosed:

"Aspect ratio" of the tire means the ratio of its section height (SH) to its section width (SW) multiplied by 100% for expression as a percentage.

"Asymmetric tread" means a tread that has a tread pattern not symmetrical about the centerplane or equatorial plane EP of the tire.

"Circumferential" means lines or directions extending along the perimeter of the surface of the annular tread perpendicular to the axial direction.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface are occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Inboard side" means the side of the tire nearest the vehicle when the tire is mounted on a wheel and the wheel is mounted on the vehicle.

"Lateral" means an axial direction.

"Net contact area" means the total area of ground contacting elements between defined boundary edges divided by the gross area between the boundary edges as measured around the entire circumference of the tread.

"Net-to-gross ratio" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that-the tread pattern is aligned with the preferred direction of travel. Conversely, a directional tread pattern has a preferred direction of travel requiring specific wheel positioning. "Axial" and "axially" means lines or directions that are parallel to the axis of rotation of the tire.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction.

"Tread element" or "traction element" means a rib or a block element.

DETAILED DESCRIPTION OF THE INVENTION

With the reference to FIGS. 1–5, a tire 10 having a tread 40 according to a preferred embodiment of the present invention is shown. The tread 40 when configured annularly has an axis of rotation R, first and second lateral edges 44,46.

The tread 40 has a plurality of ground engaging traction elements 42 separated by circumferential grooves 53,54,55, 56 and lateral grooves 57,58. Each traction element 42 extends radially outwardly from a tread base 43 to a radially outer surface 52 includes one or more sipes 47, the sipe or sipes extending laterally completely across the element 42. The lateral grooves 57,58 may intersect and join to form a continuous lateral groove path across the entire tread width. Preferably, the lateral grooves 57,58 may begin or end at ends which are laterally or circumferentially spaced and never connecting, except that this may meet at a common circumferential groove 54,55. The traction elements 42 as shown are block elements. The tread 40 as illustrated in FIGS. 1–5 has an overall or total net-to-gross ratio of about 58% measured from tread lateral edge 44 to tread lateral edge 46. It is believed that the tire 10 can be successfully produced with treads 40 having low total or overall net-to-gross ratios between 40% and 70%, preferably 50% to 65%.

The tread 40 is divided laterally into three tread zones, 60,61,62. The first zone 60 is positioned between the two wide circumferential grooves 54,55. The second zone 61 is located between the first lateral edge 44 and the first wide groove 54. The third tread zone 62 is located between the second lateral 46 edge and the second wide groove 55. The second or third tread zones 61,62 are intended to be mounted on either the outer or outboard side of the vehicle (not shown) or on the inboard side. The second and third tread zones 61,62 preferably have a net contact area less than the first tread zone 60. The first tread zone 60 preferably has a high net contact area greater than either the value of the second zone 61 or the value of the third tread zone 62. Each zone is defined as the area between specified boundary edges. The first zone 60 has boundary edges defined by two planes, one plane passing through the respective centerlines of each wide groove 54 and 55. The second zone has boundary edges defined by the lateral edge 44 and a plane passing through the centerline of groove 54 closest in proximity to the lateral edge 44. The third zone 62 has boundary edges defined by the second lateral edge 46 and a plane passing through the centerline of the groove 55.

Figure 5:
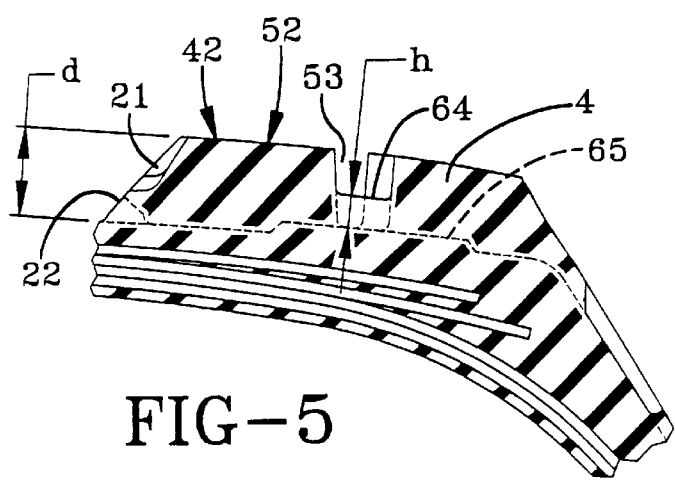
FIG. 5 is a cross-sectional view of the lateral groove 57 taken along line 5—5 of FIG. 4.

With particular reference to FIG. 5, it can be seen that the first or central tread zone 60 has an average tread road contacting axial width A, the second tread zone 61 an average tread road contacting axial width B, and the third zone 62 an average tread road contacting axial width C. In the preferred embodiment, the axial width A is greater than B or C, and axial width B is equal to C. Also, groove 54 has an average axial width D while groove 55 has an average axial width E,E being preferably equal to D. These subtle features provide very specific and significant improvements. The central zone 60 when used on the lightly loaded rear wheel position of a light truck bears most of the load. Zone 60 has the greatest axial width. The central zone 60 has a net-to-gross ratio of about 56% and an overall axial width of about 40% of TW. The second tread zone 61 has a net-to-gross ratio of about 60% and an axial width of about 30% of TW. The third tread zone 62 has a net-to-gross ratio of 60% and an axial width of 30% of TW. Groove 54 has an average axial width D of about 10% of TW and groove 55 has an average axial width E of 10% of the tread width TW. The wide groove 54 adjacent the second tread zone 61 is about equal in width to the opposite wide groove 55 adjacent the third zone 62. This feature permits the second and third zones 61,62 to exhibit much higher net-to-gross ratios improving wear and noise while maintaining the overall traction performance. In the developmental tire having a P235/75R15 size, a very important feature is demonstrated that further enhances uniform tread wear and improved traction. The actual contact area A of the middle zone 60 is 40% TW×π×diameter of the tread×56% while the second and third zones each have a contact area of 30% TW×π× diameter of the tread×60%. This relationship yields a contact area in the central zone 60 that is greater than the second or third zones 61,62 by more than 20%. Therefore, the zone 60 has a net-to-gross ratio less than zone 61 and 62 yet due to its increased width has a road contacting area greater than the zones 61 and 62 by at least 10% preferably at least 20%.

The centerlines $C_L$ of the wide grooves 54,55 are defined as the distance halfway between parallel planes at the initiation or intersection of the protrusions and the radially outer road contacting surface 52 of the traction elements 42 adjacent each side of the wide groove 54,55. The distance halfway between these planes represents the nonobstructed or open flow through width of the wide groove. This open flow through width $W_0$ is at least equal of the overall average axial width D,E of the wide grooves 54,55 as measured axially across the adjacent wide groove walls.

The inclined or sloping exterior or outer surface 22 of the protrusion 20 may have a recessed central portion 21 as shown on the traction elements 42 of the second and third zones 61,62 or a protruding central portion 23 as shown on the traction elements of the first or central zone 60. These second or protruding features 21,23 provide additional edges for off road traction enhancement.

Each protrusion 20 slopes inwardly across the imaginary centerline $C_L$ of the wide grooves 54,55. Each protrusion 20 is approximately circumferentially aligned with a lateral groove 57 or 58. As can be readily seen in FIG. 2 the protrusions extending from traction elements 42 in the central or first zone 60 point directly into the enlarged end 57A of the lateral groove 57 to which the protrusion 20 is circumferentially aligned. Under wet conditions with deep water covering the roads this feature assists in expulsion of water laterally outward. Under less severe or deep water roadway conditions the flow through portions of the wide grooves 54,55 simply push the water along the circumferential grooves length.

These protrusions 20 create numerous biting or traction surfaces in snow or off road application. As the tread 40 digs into the snow or soil these additional traction surfaces engage the snow or soil and help give additional traction.

Figure 4:
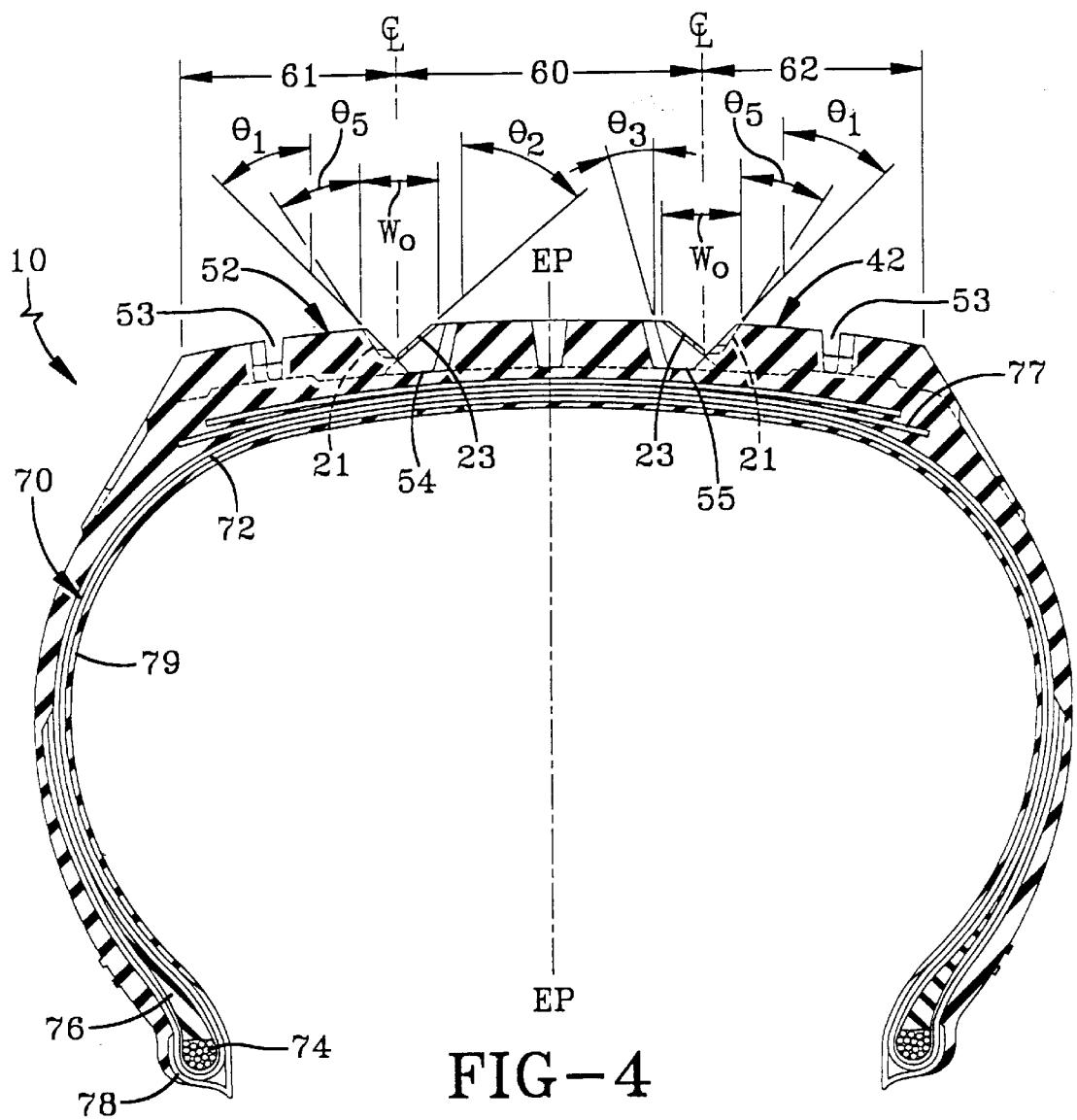
FIG. 4 is a cross-sectional view of the tire taken along line 4—4 of FIG. 2.

As shown in the cross-sectional view of the tire of FIG. 4 the protrusion 20 extending from the traction elements 42 are sloped at an angle $\theta_2$ for those elements of the central zone 60 and sloped $\theta_1$ and $\theta_5$ for protrusions 20 of the traction elements 42 of the second and third zones 61,62. Preferably the $\theta_1$ and $\theta_2$ angles are at the range of 20° to 60° relative to the radial direction while the aligned opposite side groove wall is of the conventional 3° to 10° inclination. Due to the fact that the circumferentially adjacent protrusions 20 within a wide groove 54 or 55 are oppositely inclined and the protrusions 20 axially are overlapping helps insure that the wide grooves 54,55 remain self-cleaning in very muddy or sloppy soil conditions. Heretofore, such tires were prone to have the tread pack with mud particularly in clay based soils. Once the tread pattern clogs the conventional tire loses its' traction capability. This inventive tread design insures that the channel or wide groove remains open. The combination of groove width and large sloping protrusions 20 are essential to the ability of the tread to remain self-cleaning.

Also in terms of noise generation in general all circumferential grooves have a resonance about them based upon its geometry. When the circumferential groove enters a footprint it forms a hollow tube between the tread and the road. Air goes through this tube and noise is created. Its pitch and tone are a function of the groove geometry. The overlapping protrusions change the geometry of the tube making it small thus creating a different and somewhat preferable pitch than a very wide open channel.

With a full appreciation of how well this tread pattern performs in severe road conditions, the readers attention should now be drawn to the unique features which in combination enable this tire to be very quiet under normal road or highway conditions.

First, a large portion of the lateral traction edges or surfaces actually never contact the road as the tire rolls, the entire protrusion is submerged.

Secondly, the wide grooves 54,55 have an always open channel having a minimum cross sectional area of $W_0$ allowing the air trapping the footprint to be expelled circumferentially. This means that the by pass noise generation can be reduced.

Thirdly, the lateral grooves 57,58 are deliberately located circumferentially offset. This means that as the tire tread enters or leaves road contact minimal amount of lateral edges enter or leave. Historically, circumferentially aligned lateral groove entering and leaving the footprint simultaneously create resonating noise at speed. Those skilled in the art could mitigate this noise by the employment of pitching techniques to a limited extent.

Figure 3:
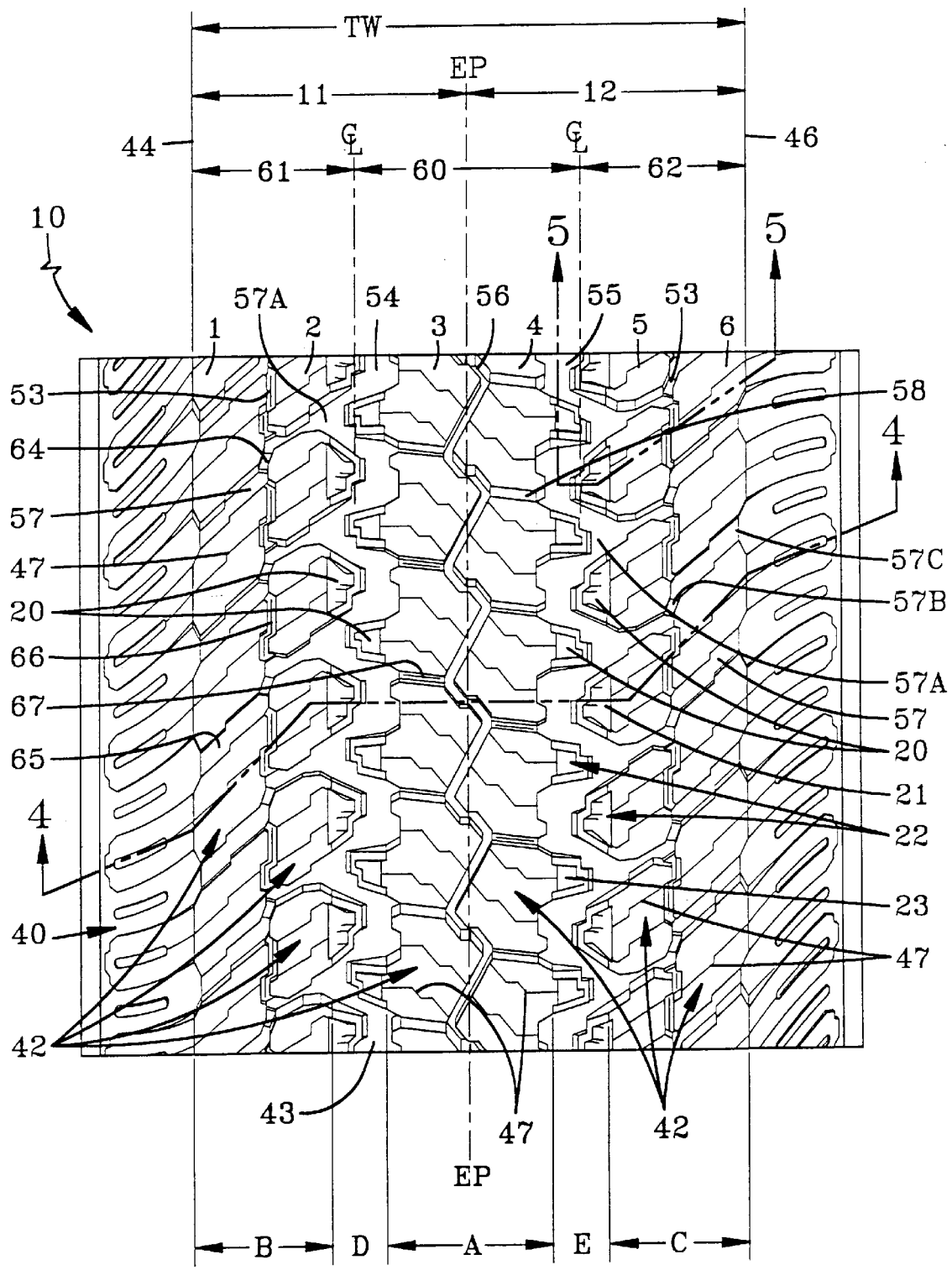
FIG. 3 is an enlarged fragmentary view of the tire of FIG. 2.

Fourthly, the tread 40 according to the invention as shown in FIGS. 3, 4 and 5 has a very unusual lateral groove 57. The groove 57 has an enlarged first end or flared opening 57A intersecting the wide grooves 54 or 55. This opening 57A narrows to a middle portion 57B which is inclined generally circumferentially and has a common path with the narrow zig-zag circumferential groove 53. In this region of the common path lies a tie bar 64 having a height h of about 50% of the groove depth d. As air or noise energy is attempting to emanate through the lateral groove 57 it must hit a traction element 42 of row 1 or 6 and then, it will partially be redirected out the reduce volume region 57B or back flow into the narrow circumferential groove 53. The noise energy passing over the tie bar 64 is then diffused when it enters an enlarged 57C portion of the groove before it is expelled from the tire. This rapid expansion antenuates the noise and acts as a damper. One of the truly novel features is the role played by the intersection of the zig-zag narrow circumferential groove. This groove in fact acts like a pressure relief in that as the expelled air volume increases due to increasing speed a portion of the flow is released along the narrow circumferential creating a sound dampening benefit that heretofore has been lacking is open tread patterns such as snow tires. This feature is like trying to blow through a whistle with a large hole in the throat as the back pressure rises a large portion of the air tends to go out the hole as opposed to going through the whistle with the net effect being little or no sound being generated.

As shown in the preferred embodiment tire, adjacent the tie bar 64 lies a reduced height tie bar 65, tie bar 65 having a height about equal to conventional tread wear indicators. The tie bar 65 extends axially outwardly to the enlarged end of portion 57C.

As further shown in FIG. 3 lying in substantially circumferentially extending zig-zag portion of narrow groove 53 is a tie bar 66. Similarly lying in the lateral grooves 58 are two tie bars 67 connecting each block 42 of row 3 and 4. Each of these tie bars 67 has a small sipe or incision as illustrated. These tie bars 66,67 provide additional stiffening rigidity to the tread elements 42. These tie bars 66,67 preferably extend radially outward from the tread base 43 a distance of less than 50% of the full tread depth (d).

As shown in FIG. 4, the preferred embodiment tire 10 has a carcass 70 with one or more plies 72 reinforced by radially extending synthetic or metal cords and a pair of substantially inextensible bead cores 74, an apex 76 radially above the bead cores 74 and a belt reinforcing structure 77 radially outward of the plies 72. The tire as shown has an air impervious halobutyl liner 79 and a rubber chaffer 78 common in tubeless type tires.

The above description details the most striking features of the preferred tread. A lesser striking but very important feature of this tread pattern is that the rate of tread wear will decrease as a function of wear due in part to the fact that the net contact area will increase as portions of the sloping protrusions begin to make road contact. This inherent aspect of this tread pattern will cause some degradation of the off-road capacity of the tread when the tire is almost fully worn. This, however, is generally true of all tread patterns when challenged with off-road performance requirements. That is, new tires will perform better than fully worn tires.

What is claimed is:

1. An on/off road radial pneumatic light truck or automobile tire (10) having a tread (40), the tread being divided into two circumferentially continuous tread halves (11,12), the tread (40) having an axis of rotation (R), a first and a second lateral edge (44,46), a tread width (TW) defined as the distance between the lateral edges (44,46), the tread (40), having a tread base (43), a plurality of circumferentially continuous grooves (53,54,55,56), two of said circumferentially continuous grooves each being a wide groove (54,55) having an average width of at least 7% of the tread width, a plurality of laterally extending zigzag grooves (57,58) intersecting the circumferential grooves, and a plurality of traction elements (42) extending radially outwardly from the tread base (43) to an outer surface (52) of the traction element, the traction elements (42) being oriented in circumferential rows, on each tread half two axially adjacent rows (2, 3 or 4, 5) of the traction elements (42) are separated by one of the wide grooves (54,55):

on each tread half, a plurality of protrusions (20), the protrusions (20) extending from the traction elements (42) into the wide groove (54 or 55), the protrusion (20) sloping radially inwardly at an angle in the range of 20° to 60° relative to the radial direction from the outer surface of the traction element toward the tread base (43), the tread characterized by having the protrusions (20) crossing axially more than halfway across the groove width of the wide groove toward an intersection of a lateral groove (57,58) and the wide groove (54,55), the protrusions (20) extending from the traction elements (42) on one side of the wide groove (54,55) being circumferentially offset and at least partially axially overlapping with the protrusions (20) extending from the traction elements (42) on the opposite side of the wide groove (54,55), each wide groove (54,55) has a centerline dividing the tread (40) into three portions; a middle portion (60), a first portion (61) and a second portion (62), the first and second portions (61,62) being adjacent a lateral edge (44,46), the middle portion (60) having a lesser net-to-gross ratio than either the first or second portion, the middle portion (60) having a large road contacting surface area greater than the road contacting area of either the first portion (61) or the second portion (62) by at least 10% and wherein the tread (40) has a net-to-gross ratio in the range of 50 to 65% as measured around the entire circumference of the tread between the lateral edges (44,46) and the middle portion (60) has an axial width being about 40% of the tread width and each first and second tread portions (61,62) having an axial width of about 30% of the tread width.

2. The tire (10) of claim 1 wherein there are six rows (1,2,3,4,5,6.) of the traction elements, (42) on each tread half, two rows of the six rows being between each lateral edge (44,46) and a wide groove (54,55) and being separated by a narrow zigzag circumferential groove located between a lateral edge (44,46) and a wide groove (54,55).

3. The tire (10) of claim 2 wherein the tread (40) has a net-to-gross ratio of 58% as measured around the entire circumference of the tire (10) between the lateral edges (44,46).

4. The tire (10) of claim 3, wherein each zigzag lateral groove (57) has an enlarged generally axially extending inner end portion (57A) intersecting the wide circumferential groove (54,55) and an enlarged generally axially extending outer end portion (57C) and a tiebar (64) located between the enlarged end portions (57A,57B), the tie-bar (64) extending radially outward from the tread base (43) a distance (h) of about one-half a lateral groove depth (d) of the lateral groove and lying in a common intersection of a narrow zigzag circumferential groove and a narrow portion of the lateral groove wherein the common intersection is generally circumferentially inclined.

* * * * *